Jan. 14, 1936. A. L. V. C. DEBRIE 2,027,678
CINEMATOGRAPHIC FILM DRIVING DEVICE
Filed Dec. 11, 1934

Inventor
A. L. V. C. Debrie
By E. F. Wenderoth
Atty

Patented Jan. 14, 1936

2,027,678

UNITED STATES PATENT OFFICE 2,027,678

CINEMATOGRAPHIC FILM DRIVING DEVICE

André Léon Victor Clément Debrie, Paris, France

Application December 11, 1934, Serial No. 757,058

1 Claim. (Cl. 88—18.4)

It is well known that in most of the cinematographic apparatuses, as well in the cameras as in the projecting devices, the film progresses by jerks; therefore it is driven by pins penetrating into apertures provided on one side of the film or on both, said pins being given a reciprocating vertical movement and driving the film say when moving downwards and disengaging said film in order to leave it unmoved during their upward stroke, at the end of which they approach the film and engage anew its perforations in order to drive it again during the following downward stroke and so on. The movement to be given to the pins is thus a rather complicated one and especially when said film is provided with apertures on both edges; films carrying in addition to the pictures a sound record are generally provided with a single line of apertures, and this allows plainer embodiments of the driving device.

The present invention has for its object a device of that kind wherein the pins are mounted on a bracket which is hinged on a frame receiving a reciprocating motion parallel to the film, the bracket receiving besides a reciprocating angular motion round the hinges in order to engage the pins into the apertures of the film during one stroke of the frame and disengage them during the following one so as to free then entirely said film. Both reciprocating motions of the frame and bracket are produced by cams drivingly connected with one another and rotating with uniform speed.

The following disclosure and the annexed drawing show by way of example a form of execution of the invention.

Figure 1:
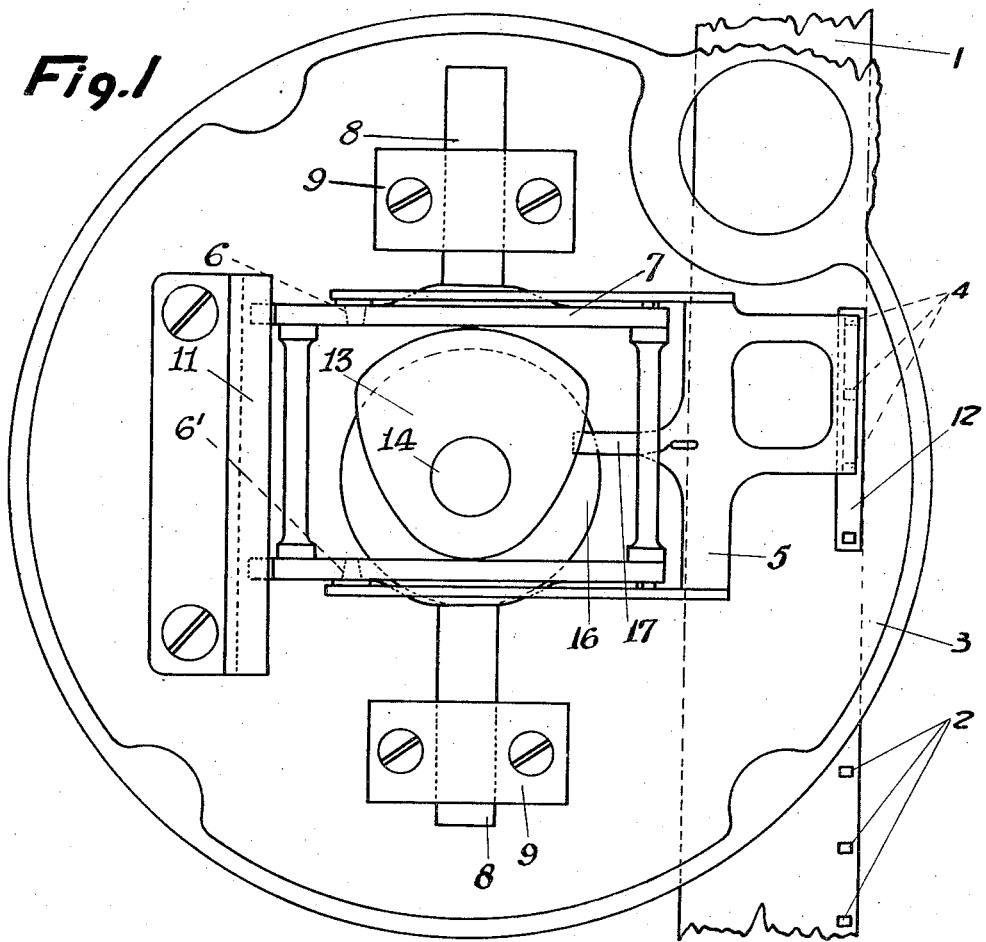
Fig. 1 shows diagrammatically a front view of the apparatus.

Film 1 provided with a range of apertures 2 is movable parallelly to a flange 3 against which it is held by any convenient means, not shown; pins 4, in the number of three in the figures, but which of course may be more or less numerous, are mounted on a bracket 5; at its other end said bracket is hinged in 6, 6' on a frame 7; this latter is supported by stems 8 sliding in bearings 9 and further slides itself in a straight guide 11 secured on flange 3 which keeps it parallel to said flange. During the motion of the frame the pins may move into slot 12 of the flange.

An eccentric cam 13 keyed on a spindle 14 rotating at uniform speed is engaged in frame 7 and gives it, by its rotation, a reciprocating vertical motion the amplitude of which is equal to the progress to be given to the film at each of its displacements.

Figure 2:
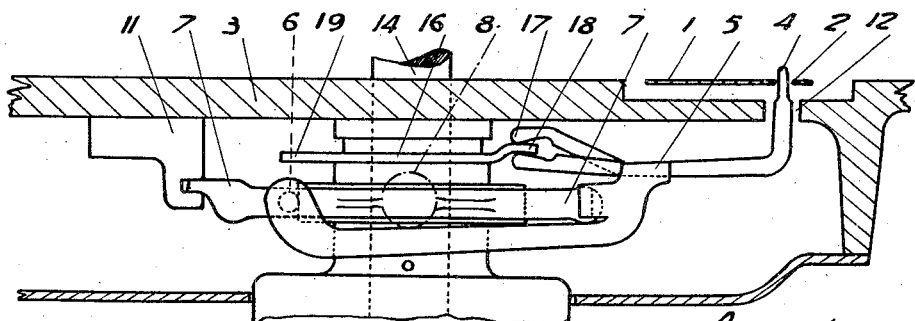
Fig. 2 is a plane view of the same.

On another hand a plate cam 16 is keyed on the same spindle and its edge passes in a sprong 17 mounted on bracket 5. In a general way plate cam 16 is parallel to the flange but presents on its periphery parts more or less near thereto. It is obvious in Fig. 2 that when sprong 17 is engaged with a part 19 of the cam 16 close to the flange, viz. is in the position shown in the figure, pins 4 are engaged in the apertures of the film; contrarily when sprong 17 is on a part 19 farther from the flange, bracket 5 is repelled backwards and pins 4, coming inside the flange, free the film which is no more driven thereby and consequently remains motionless.

Plate cam 16 is disposed in such a way relatively to eccentric cam 13 that the film is driven only during one of the strokes of frame 7, say during the downward one, the film remaining motionless during the upward stroke.

It should be obviously possible, without extending the scope of the invention to use other devices than cams such as 15 and 16 for giving frame 7 and bracket 5 the necessary conjugated motions.

What I claim is:

An intermittent driving device for apertured cinematographic films comprising a flange located parallel to the film and serving as a backing for said film, a movable frame having stems mounted thereon, bearings upon said flange in which said stems slide, a rectilinear guide positioned on said flange in which a portion of said frame slides, a spindle perpendicular to said flange and rotating with uniform speed, an eccentric cam fixed on said spindle and disposed inside the frame, a bracket hinged on said frame in such a way that it may pivot about an axis parallel to the stems guiding said frame, pins disposed at the end of the bracket opposite the hinge point thereof and able to pass through a slot provided on the flange and to engage the apertures of the film, a plate cam parallel to the flange and fixed on said spindle, the periphery of said cam having two parts, one of said parts being further from and the other nearer to said flange, a prong fixed on the part of the bracket opposite to the hinge point thereof and engaging the periphery of said plate cam, the eccentric cam and the plate cam being so disposed relatively to one another that said bracket is removed from the flange during one stroke of the frame and brought near enough thereto for allowing the pins to engage the apertures of the film during the other stroke.

ANDRÉ LÉON VICTOR CLÉMENT DEBRIE.